US006275874B1

(12) United States Patent
Wilson

(10) Patent No.: US 6,275,874 B1
(45) Date of Patent: Aug. 14, 2001

(54) SYSTEM FOR PRODUCING COMMUNICATION CODES RESPONSIVE TO COMMUNICATION SIGNALS, TRANSLATING COMMUNICATION CODES INTO PERIPHERAL CODES, AND PRODUCING SIGNALS FOR COMMUNICATING WITH PERIPHERAL RESPONSIVE TO PERIPHERAL CODES

(75) Inventor: John Edwin Wilson, Cochrane (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/220,073

(22) Filed: Dec. 23, 1998

(51) Int. Cl.[7] ...................................................... G06F 3/00
(52) U.S. Cl. .................. 710/8; 710/15; 710/19; 709/223; 370/85.8; 370/95.2
(58) Field of Search ................... 710/8, 15, 19; 370/85.8, 95.2; 709/223

(56) References Cited

U.S. PATENT DOCUMENTS 5,832,298 * 11/1998 Sanchez et al. ..................... 395/828
5,862,404 * 1/1999 Onaga .................................. 395/828
5,878,278 * 3/1999 Carreiro et al. ..................... 395/859
5,949,979 * 9/1999 Snow et al. .......................... 395/283
6,067,558 * 5/2000 Wendt et al. ........................ 709/202

\* cited by examiner

Primary Examiner—Thomas Lee
Assistant Examiner—Rehana Perveen

(57) ABSTRACT

An apparatus, system and methods for establishing communications with at least one peripheral are disclosed. One method includes receiving at least one parameter associated with at least one peripheral and transmitting to at least one device desirous of communicating with the peripheral, notice of availability of the peripheral, in response to receipt of a parameter. A further method involves producing communication codes in response to communication signals received at a communications port, translating the communication codes into peripheral codes, and producing signals at a peripheral port for controlling a peripheral in response to the peripheral codes. The apparatus includes a communications port, a translator in communication with the communications port and a peripheral port in communication with the translator. The system includes the apparatus and a peripheral adjunct management client.

36 Claims, 1 Drawing Sheet

SYSTEM FOR PRODUCING COMMUNICATION CODES RESPONSIVE TO COMMUNICATION SIGNALS, TRANSLATING COMMUNICATION CODES INTO PERIPHERAL CODES, AND PRODUCING SIGNALS FOR COMMUNICATING WITH PERIPHERAL RESPONSIVE TO PERIPHERAL CODES

BACKGROUND OF THE INVENTION

1. Field of the Invention

This invention relates to universal communication with peripheral devices, and more particularly to communication with a plurality of peripheral devices using a common communications protocol on a common communications channel.

2. Description of Related Art

There are various manufacturers of peripheral devices including printers, bar code readers, and scanners, for example. Each manufacturer and peripheral employs its own communications protocol to enable a control device such as a computer to communicate with the peripheral.

In a computer system, the problem of different communications protocols for different peripheral devices is solved by employing drivers specifically designed to interface a computer bus to a peripheral device to enable communication therebetween. However, this problem is compounded with the proliferation of distributed systems in which printers, for example, may be controlled by one or more widely distributed computers on a local area network. In such distributed systems, for each computer to have access to each printer, each computer must have the required drivers for each printer.

Printers are usually connected to a local area network by an adapter card which resides in a computer. The adapter card communicates with a parallel port of the computer to control the printer with codes specific to that printer. Such codes are sent over the network from an originating computer, which may be any computer configured with a suitable driver to produce the necessary control codes to control the printer. Thus, the originating computer produces the codes required by the printer to control the printer and sends such codes over the network to the adapter card. Consequently, each originating computer must have an appropriate driver to produce the necessary codes to control the printer. This requires that each originating computer have knowledge of each available printer. This can be daunting to maintain. What would be desirable therefore, is a universal system for communication with peripheral devices.

SUMMARY OF THE INVENTION

The present invention addresses the above problems by providing a universal system and method for communication with peripheral devices which allows for a common communications protocol or language to be used to communicate with any peripheral device and which provides for translation of communications from the common communications protocol to the specific protocol required by the peripheral device. Furthermore, it provides the ability to employ a common communications medium on which a plurality of computers and peripherals can communicate to achieve distributed processing without installing peripheral specific drivers in each computer to enable each computer to communicate with each peripheral device. In one embodiment, this common communications medium includes a network employing the TCP/IP protocol and thus the invention effectively provides a way of permitting peripherals to communicate on an internet or intranet, thereby allowing users of the world wide web to access input/output resources at any location thereon.

In accordance with one aspect of the invention, there is provided an apparatus including a communications port, a translator in communication with the communications port, and a peripheral port in communication with the translator. The communications port receives communication signals and produces communication codes in response thereto. The translator translates the communication codes into peripheral codes. The peripheral port produces signals for communicating with a peripheral in response to the peripheral codes. Preferably, the peripheral port also receives signals from the peripheral and produces peripheral codes in response thereto, the translator also translates the peripheral codes into communication codes, and the communications port also produces communication signals in response to the communication codes.

In accordance with another aspect of the invention, there is provided a system including the apparatus described above and further including a peripheral adjunct management client for receiving at least one configuration table and for communicating an augmented configuration table to the apparatus. Preferably, the peripheral adjunct management client includes a transmitter for transmitting a notice of availability of at least one of a plurality of peripherals to devices in communication with the apparatus, which may desire to communicate with one of the peripherals.

In accordance with yet another aspect of the invention, there is provided a method for carrying out the above functions.

In accordance with a further aspect of the invention, there is provided a method and apparatus for establishing communications with at least one peripheral. The method includes receiving at least one parameter associated with the peripheral, and transmitting a notice of availability of the peripheral to at least one device desirous of communicating with the peripheral, in response to receipt of the at least one parameter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
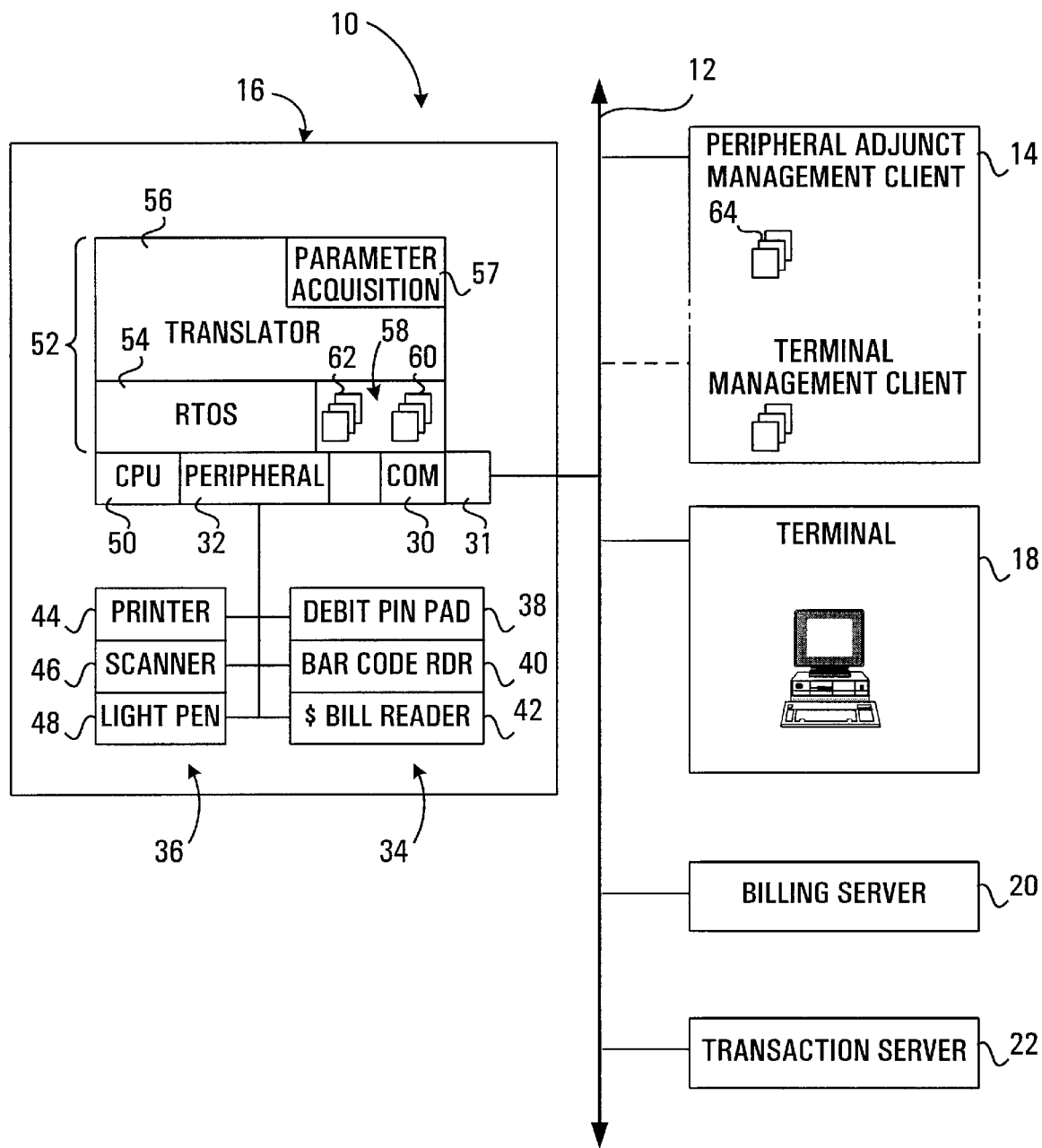
FIG. 1 is a schematic representation of a system for providing universal communication with peripheral devices, according to a first embodiment of the invention.

A system for providing universal communication with peripheral devices is shown generally at 10 in FIG. 1. In this embodiment, the system includes a TCP/IP network shown generally at 12, to which is connected a peripheral adjunct management client 14 and a universal translator apparatus shown generally at 16.

The peripheral adjunct management client 14 and the translator apparatus 16 are both operable to communicate using the network 12, to provide for communications with each other and to provide for communications with a terminal 18, for example, also connected to the network 12. In addition, a billing server 20 and a transaction server 22 may also be connected for communication on the network 12.

In this embodiment, the network 12 supports communications using the TCP/IP protocol and thus may be connected to an internet services provider, for example. This facilitates positioning of the peripheral adjunct management client 14 in one city, for example, and the translator apparatus 16 in another city, the terminal 18 in yet another city and a billing server and transaction server 20 and 22 in two more cities respectively. In other words, the system is distributed. Alternatively, the use of the TCP/IP network protocol may be replaced with any other network protocol, such as sequel net, for example.

In this embodiment, the translator apparatus includes a communications port 30, having a network interface 31 for placing the communications port in communication with the network 12 according to the TCP/IP protocol. Data according to this protocol is carried on the network in TCP/IP packets. Generally, the communications port 30 produces communication codes in response to communications signals received at the communications port via the network and produces communications signals on the network in response to communication codes received at the communications port.

The translator apparatus 16 further includes a peripheral port 32 and first and second pluralities of peripheral devices 34 and 36 respectively. The first plurality of peripheral devices includes a debit pin pad 38, a bar code reader 40 and dollar bill reader 42. Generally, these devices are considered to be "dumb" devices and employ relatively simple protocols for communication with control devices. The second plurality 36 includes a printer 44, a scanner 46 and light pen 48. The peripherals of the second plurality are considered to be intelligent devices and employ higher level communications protocols for communication with control devices.

The peripheral port 32 may include one or more individual ports connected to and in communication with respective peripheral devices by respective signalling media required by the respective peripheral devices. Such signalling media may include an IP bus, a parallel bus, a serial bus, or a universal serial bus, for example. In this embodiment, the peripheral port includes six individual ports in communication with the debit pin pad 38, bar code reader 40, dollar bill reader 42, printer 44, scanner 46, and light pen 48 respectively. Generally, each individual port is operable to produce signals to communicate with a respective peripheral in response to peripheral codes provided to the individual port and to provide peripheral codes to the peripheral port in response to signals received at that individual port from the corresponding peripheral.

The translator apparatus further includes a processor circuit 50, which in this embodiment includes a central processing unit (CPU). The processor circuit 50 is in communication with memory shown generally at 52 in which is stored codes 54 for directing the processor circuit 50 to execute a real time operating system. Also stored in the memory are translator codes 56 for directing the processor circuit to execute translator functions for translating communication codes into peripheral codes and for translating peripheral codes into communication codes. The memory further contains parameter acquisition codes 57 for acquiring parameters for "dumb" peripherals from the peripheral adjunct management client 14.

The memory further includes a plurality of configuration tables shown generally at 58. Each configuration table stores at least one configuration parameter of an associated peripheral. Consequently, there is a first plurality of configuration tables 60 associated with the first plurality of peripherals 34 and a second plurality of configuration tables 62 associated with respective peripherals of the second plurality 36.

The configuration tables 60 associated with the "dumb" peripherals in the first plurality 34 hold configuration parameters associated with each control or status function of each corresponding "dumb" peripheral 38–42.

When a "dumb" peripheral is connected to one of the individual ports, the processor circuit 50 is directed to communicate with the peripheral port to receive from the peripheral connected thereto, at least one configuration parameter. Such configuration parameter is then stored in the associated configuration table. Then, the parameter acquisition codes 57 direct the processor circuit 50 to transmit a query message to the peripheral adjunct management client 14 over the network 12, the query message identifying the dumb peripheral for which parameters are required. In response, the peripheral adjunct management client searches an internal database 64 of configuration tables for a configuration table corresponding to the peripheral identified by the query message.

Upon finding the corresponding configuration table, the peripheral adjunct management client 14 transmits a parameter message, containing the contents of the corresponding configuration table, to the translator apparatus 16 over the network 12. The parameter acquisition codes 57 then direct the processor circuit 50 to store the received configuration table in the first plurality of configuration tables 60.

In other words, when a dumb peripheral is connected to one of the individual ports, the processor circuit (i.e. the processor circuit) receives from the peripheral at least one configuration parameter, such as identity, for example. The processor circuit 50 essentially transmits from the communications port to the peripheral adjunct management client 14, a configuration table containing only the identity of the peripheral. The peripheral adjunct management client responds by transmitting to the translator apparatus an augmented configuration table, containing a plurality of configuration parameters other than simply the identity of the peripheral. The augmented configuration table is received by the processor circuit 50 via the communications port 30, and the processor circuit 50 stores the augmented configuration table in the memory 52 at the translator apparatus.

Alternatively, the query message need not identify the new dumb peripheral, rather the translator apparatus may be programmed to poll the peripheral adjunct management client to determine whether or not any new configuration tables are available for that translator apparatus and if one is available, download such table into the first plurality of tables 60. This permits a configuration table to be stored at the peripheral adjunct management client and a new peripheral to be installed in the translator apparatus 16 at different times. The peripheral would be installed first and then at a later date, or time, an appropriate configuration table can be added to the database 64. Recognition of the peripheral device is then deferred until polling occurs at which time the configuration table is downloaded and the peripheral is ready for use.

Consequently, each time a new "dumb" peripheral is installed, a new configuration table is added to the first plurality of configuration tables 60.

In this embodiment, the configuration tables 60 and 62 hold configuration parameters including peripheral type identifiers, alarm capability codes, operational capability codes, treatment capability codes and codes representing other restrictions. The peripheral type identifiers identify the type of peripheral, such as debit pin pad, bar code reader, bill reader, printer, scanner and light pen. The alarm capability codes include, in the case of the printer, for example, low paper codes, paper jam, buffer full and the like. The operational capability codes include, in the case of the printer, for example, codes representing 15 sheets per minute, 800 sheet storage capacity and the like. In the case of the scanner, such codes may represent 1,200 dots per inch resolution, for example. The treatment capability codes include codes representing PCL langauge, postscript or straight IP, for example. The codes identifying other restrictions include codes representing time of day or user restrictions, for example.

The configuration tables 60 and 62 also identify translation routines which, under the direction of the translator codes 56, direct the processor circuit to act as a translator to translate communication codes received from the communications port 30 into control codes or control code sequences, for controlling the associated peripheral. Thus, the translator employs at least a portion of the augmented first configuration table to translate communication codes into peripheral codes.

In addition, the configuration tables include translation routines also controlled by the translator codes 56 for directing the processor circuit 50 to translate peripheral codes received from one of the peripherals into communication codes to be presented to the communications port 30, for inclusion in TCP/IP packets on the network 12.

The second plurality of configuration tables 62 a re associated with the more complex, "intelligent" peripherals 44 through 48 and thus contain more information and translation routines than included in configuration tables of the first plurality 60. Upon installing one of the intelligent peripherals 44, 46 or 48, such peripheral may immediately provide to its corresponding individual port a list of basic codes and parameters which are received by the processor circuit 50 and stored in associated configuration tables in the second plurality 62. This provides the configuration tables with basic information about how the associated peripheral can be controlled or how it will present data and/or status.

In general, when a new peripheral is added to the translation apparatus or when the translation apparatus is first connected to the network 12, the processor circuit 50 provides communication codes representing the configuration tables to the communications port 30 for communication on the network 12 to the peripheral adjunct management client 14. This may be referred to as publishing the configuration of the translator apparatus. Upon receiving the published configuration, the peripheral adjunct management client 14 checks the internal database 64 of configuration tables to determine whether such tables correspond to those just received. If so, any additional information contained in a corresponding configuration table of the peripheral adjunct management client's internal database not contained in the configuration table received from the translator apparatus is transmitted back to the translator apparatus and stored in the corresponding configuration table. In this way, the configuration tables stored at the translator apparatus are augmented or filled out with any additional information useful for effectively controlling, or receiving data from a peripheral. Effectively, the peripheral adjunct management client, in response to receiving a configuration table, transmits an augmented configuration table back to the translator apparatus for receipt at the communications port thereof.

Similarly, if a configuration table received at the peripheral adjunct management client contains information not found in the corresponding configuration table in the internal database 64 of the peripheral adjunct management client, the internal database configuration table is updated. This includes making a new configuration table in the internal database from a copy of the configuration table received from the translator apparatus when no corresponding configuration table is found in the internal database. In other words, the configuration tables in the translator apparatus and the peripheral adjunct management client 14 are synchronized when the translator apparatus "publishes" its configuration status.

After synchronizing the configuration tables, a network transmitter at the peripheral adjunct management client then transmits to the terminal, billing server and transaction server 18, 20 and 22 respectively, and to any other devices on the network, a notice of availability of the peripherals associated with corresponding configuration tables. In other words, the peripheral adjunct management client transmits a notice of availability of the peripheral to devices desirous of communicating with a peripheral. Such notice of availability may include a copy of the configuration tables stored at the translator apparatus. Or, when a device requires to communicate with a peripheral, the configuration table for that peripheral may be retrieved from the peripheral adjunct management client. It will be appreciated that the notice is transmitted on the same network on which the configuration table was received.

After the notice of availability and the configuration table for the desired peripheral has been received by the terminal 18, billing server 20, and/or transaction server 22, these devices can communicate with the translation apparatus to communicate with the desired peripheral. In order to facilitate such communications, the terminal, billing server or transaction server 18, 20 and 22 transmit TCP/IP packets on the network 12 including communication codes according to a general peripheral device communications protocol which may be any protocol capable of providing for communications of all possible codes sendable to all possible peripherals and capable of providing for communications of all possible cods sendable from all possible peripherals. The packets containing such communication codes are received at the communications port 30 and TCP/IP headers and other overhead are stripped off leaving just the communication codes. These communication codes are then translated by the translator in response to the translator codes 56 with the cooperation of the appropriate configuration table for the intended peripheral, to produce peripheral control codes for the intended peripheral. Such peripheral control codes are communicated from the peripheral port 32 directly to the intended peripheral by signals produced by the peripheral port and understandable by the peripheral. Thus, the translator employs at least a portion of the first configuration table to translate communication codes into peripheral codes.

Similarly, communications can occur from a peripheral to the terminal, billing server or transaction server 18, 20 or 22. Such communications are initiated by a peripheral which presents signals to the peripheral port 32. The peripheral port produces peripheral codes in response to such signals. The peripheral codes are then translated by the translator codes 56, using the corresponding configuration table from the first or second pluralities of configuration tables 60 or 62, as appropriate, to produce communication codes according to the general peripheral device communications protocol, which are provided to the communications port 30 for inclusion in TCP/IP packets on the network 12. Such packets are addressed and transmitted to the terminal 18, billing server 20 or transaction server 22 as appropriate.

In the embodiment described above, the notice of availability was published by the peripheral adjunct management client. Alternatively, however, the notice of availability may be transmitted on the network by the translator apparatus itself, rather than by the peripheral adjunct management client. Thus, processor circuit is programmed to transmit a notice of availability of at least one of the plurality of peripherals, to devices in communication with the apparatus, which may desire to communicate with at least one of the plurality of peripherals.

In yet a further alternative embodiment, in the case of "intelligent" peripherals, omitting the augmentation or synchronization process and even omitting the peripheral adjunct management client entirely, still provides significant advantages since the translator apparatus publishes on the network a notice of availability, which may include a configuration table containing parameters extracted from the intelligent peripheral. The translator apparatus is still able to employ the configuration table to translate communication codes, according to the general peripheral device communications protocol, into peripheral control codes for the intended peripheral. The benefit of the additional parameters obtained through the synchronization process, however, would be lost, and in the case of "dumb" terminals, a system operator would have to manually install configuration parameters at the translator apparatus.

In a variation of this alternative embodiment, the internal database 64 may be embodied in the translator apparatus itself and periodically updated, either manually or automatically, to include parameters for newly-designed peripherals.

While specific embodiments of the invention have been described and illustrated, such embodiments should be considered illustrative of the invention only and not as limiting the invention as construed in accordance with the accompanying claims.

What is claimed is:

1. An apparatus comprising:
   a) a communications port for receiving communication signals and for producing communication codes in response thereto;
   b) a translator in communication with said communications port, for translating said communication codes into peripheral codes; and
   c) a peripheral port in communication with said translator for producing signals for communicating with a peripheral in response to said peripheral codes.

2. An apparatus as claimed in claim 1 wherein:
   a) said peripheral port is operable to receive signals from said peripheral and produce peripheral codes in response thereto;
   b) said translator is operable to translate said peripheral codes into communication codes; and
   c) said communications port is operable to produce communication signals in response to said communication codes.

3. An apparatus as claimed in claim 2 further including a network interface for placing said communications port in communication with a network.

4. An apparatus as claimed in claim 3 wherein said network interface is operable to place said communications port in communication with a TCP/IP network.

5. An apparatus as claimed in claim 1 further including at least one peripheral in communication with said peripheral port.

6. An apparatus as claimed in claim 5 further including a first configuration table for defining at least one configuration parameter of said at least one peripheral.

7. An apparatus as claimed in claim 6 wherein said translator employs at least a portion of said first configuration table to translate said communication codes into said peripheral codes.

8. An apparatus as claimed in claim 6 further including a processor circuit in communication with said peripheral port for receiving said at least one configuration parameter from said at least one peripheral and for storing said at least one configuration parameter in said first configuration table.

9. An apparatus as claimed in claim 6 further including a processor circuit, in communication with said communications port and operable to transmit said first configuration table from said communications port.

10. An apparatus as claimed in claim 8 wherein said processor circuit is programmed to receive an augmented first configuration table from said first communications port.

11. An apparatus as claimed in claim 10 wherein said processor circuit is programmed to act as said translator.

12. An apparatus as claimed in claim 11 wherein said translator employs at least a portion of said augmented first configuration table to translate said communication codes into said peripheral codes.

13. An apparatus as claimed in claim 1 further including a plurality of peripheral ports for producing peripheral signals receivable by respective peripherals.

14. An apparatus as claimed in claim 13 further including a plurality of peripherals each in communication with a respective one of said plurality of peripheral ports.

15. An apparatus as claimed in claim 14 further including a plurality of configuration tables, each of said configuration tables being associated with a respective one of said plurality of peripherals, for defining at least one configuration parameter of said respective one of said plurality of peripherals.

16. An apparatus as claimed in claim 15 further including a processor circuit in communication with said plurality of peripheral ports for receiving said at least one configuration parameter from one of said peripherals and for storing said at least one configuration parameter in an associated one of said of configuration tables.

17. An apparatus as claimed in claim 15 further including a processor circuit, in communication with said communications port and operable to transmit said plurality of configuration tables from said communications port.

18. An apparatus as claimed in claim 16 wherein said processor circuit is programmed to receive at said communications port at least one augmented configuration table associated with a respective one of said of peripherals.

19. An apparatus as claimed in claim 18 wherein said processor circuit is programmed to act as said translator.

20. An apparatus as claimed in claim 19 wherein said translator employs at least a portion of one of said at least one augmented configuration tables to translate communication codes from said communications port into respective peripheral codes for the associated peripheral.

21. An apparatus as claimed in claim 15 wherein said processor circuit is programmed to transmit a notice of availability of at least one of said plurality of peripherals to devices in communication with said apparatus, which may desire to communicate with at least one of said plurality of peripherals.

22. An apparatus as claimed in claim 21 wherein said processor circuit is programmed to include at least one of said plurality of configuration tables in said notice of availability.

23. A system including the apparatus as claimed in claim 20 and further including a peripheral adjunct management client for receiving said at least one configuration table and for communicating said at least one augmented configuration table to said apparatus.

24. A system as claimed in claim 23 wherein said peripheral adjunct management client includes a transmitter for transmitting a notice of availability of at least one of said plurality of peripherals, to devices in communication with said apparatus, which may desire to communicate with said at least one of said plurality of peripherals.

25. An apparatus comprising:
   a) means for producing communication codes in response to communication signals received at a communications port;
   b) means for translating said communication codes into peripheral codes; and
   c) means for producing signals at a peripheral port for controlling a peripheral in response to said peripheral codes.

26. An apparatus as claimed in claim 25 further including:
   a) means for producing peripheral codes in response to signals received at said peripheral port;
   b) means for translating said peripheral codes into communication codes; and
   c) means for producing communication signals at said communications port in response to said communication codes.

27. A method comprising:
   a) producing communication codes in response to communication signals received at a communications port;
   b) translating said communication codes into peripheral codes; and
   c) producing signals at a peripheral port for controlling a peripheral in response to said peripheral codes.

28. A method as claimed in claim 27 further including:
   a) producing peripheral codes in response to signals received at said peripheral port;
   b) translating said peripheral codes into communication codes; and
   c) producing communication signals at said communications port in response to said communication codes.

29. A method as claimed in claim 28 further including communicating between said communications port and a network.

30. A method as claimed in claim 29 wherein communicating includes communicating between said communications port and a TCP/IP network.

31. A method as claimed in claim 27 further including defining at least one configuration parameter of at least one peripheral in communication with said peripheral port.

32. A method as claimed in claim 31 further including receiving said at least one configuration parameter from said at least one peripheral and storing said at least one configuration parameter in a configuration table.

33. A method as claimed in claim 32 wherein translating includes employing at least a portion of said configuration table to translate communication codes into peripheral codes.

34. A method as claimed in claim 31 further including transmitting said at least one configuration table from said communications port.

35. A method as claimed in claim 34 further including receiving at least one augmented configuration table at said communications port.

36. A method as claimed in claim 35 wherein translating includes employing at least a portion of said at augmented configuration table to translate communication codes into said peripheral codes.

* * * * *